United States Patent

Fisher

(10) Patent No.: US 9,492,758 B2
(45) Date of Patent: Nov. 15, 2016

(54) BODY AND GESTURE RECOGNITION FOR WATER PLAY STRUCTURE

(71) Applicant: Skyturtle Technologies Ltd., Enderby (CA)

(72) Inventor: Lance C. Fisher, Enderby (CA)

(73) Assignee: Skyturtle Technologies Ltd., Enderby (CA)

( * ) Notice: Subject to any disclaimer, the term of this patent is extended or adjusted under 35 U.S.C. 154(b) by 0 days.

(21) Appl. No.: 14/613,238

(22) Filed: Feb. 3, 2015

(65) Prior Publication Data

US 2015/0217200 A1   Aug. 6, 2015

Related U.S. Application Data

(60) Provisional application No. 61/935,442, filed on Feb. 4, 2014.

(51) Int. Cl.
   *A63G 31/00*    (2006.01)
   *G06F 3/01*    (2006.01)

(52) U.S. Cl.
   CPC ............ *A63G 31/007* (2013.01); *G06F 3/017* (2013.01)

(58) Field of Classification Search
   CPC ................. A63G 31/007; A63G 21/00; A63G 21/18; A63G 1/00; A63G 1/12; A63G 3/00; A63G 3/02
   USPC ................. 472/117, 128, 129, 13; 239/16–18
   See application file for complete search history.

(56) References Cited

U.S. PATENT DOCUMENTS

| | | | |
|---|---|---|---|
| 5,194,048 A | 3/1993 | Briggs | |
| 5,405,294 A | 4/1995 | Briggs | |
| 5,662,525 A | 9/1997 | Briggs | |
| 5,782,204 A | 7/1998 | Rahn | |
| 5,820,471 A | 10/1998 | Briggs | |
| 5,967,901 A | 10/1999 | Briggs | |
| 6,132,318 A | 10/2000 | Briggs | |
| 6,210,287 B1 | 4/2001 | Briggs | |
| 6,261,186 B1 * | 7/2001 | Henry | A63G 1/12 239/16 |
| 6,569,023 B1 | 5/2003 | Briggs | |
| 6,702,687 B1 * | 3/2004 | Henry | A63G 31/007 472/117 |
| 6,739,979 B2 * | 5/2004 | Tracy | B05B 17/08 472/117 |
| 6,786,830 B2 | 9/2004 | Briggs et al. | |
| 7,179,173 B2 | 2/2007 | Henry et al. | |
| 7,674,184 B2 * | 3/2010 | Briggs | A63G 3/02 463/40 |
| 8,079,916 B2 * | 12/2011 | Henry | A63G 3/02 472/117 |
| 8,226,493 B2 * | 7/2012 | Briggs | A63G 3/02 273/440 |
| 2012/0223882 A1 | 9/2012 | Galor et al. | |

FOREIGN PATENT DOCUMENTS

| | | |
|---|---|---|
| RU | 61598 U1 | 3/2007 |
| RU | 83935 U1 | 6/2009 |

\* cited by examiner

*Primary Examiner* — Kien Nguyen
(74) *Attorney, Agent, or Firm* — Schacht Law Office, Inc.; Dwayne Rogge

(57) ABSTRACT

The present disclosure provides a gesture capture hardware to visually receive position and/or gestures and translate visual signals to actuates of a water play feature in a water play structure.

17 Claims, 5 Drawing Sheets

BODY AND GESTURE RECOGNITION FOR WATER PLAY STRUCTURE

RELATED APPLICATIONS

This application claims priority benefit of U.S. Provisional Application Ser. No. 61/935,442, filed Feb. 4, 2014, incorporated herein by reference.

BACKGROUND OF THE DISCLOSURE

Field of the Disclosure

This disclosure relates to water play structures typically installed in municipalities or waterparks that allow children and other participants to interact with water devices.

BRIEF SUMMARY OF THE DISCLOSURE

Disclosed herein is a body position and gesture tracking feature composed of hardware and software is used to dynamically control the output of one or more water features making a water play structure more interactive to a participant without the need for any electronic tracking devices carried by the participant.

DETAILED DESCRIPTION OF THE DISCLOSURE

Disclosed herein are several examples of a body and gesture recognition system for a water play structure. Such water play structures include splash pads, wave pools, and water directing structures. The term "splash pad" implies a water play structure commonly designed for smaller participants wherein the accessible water volume and depth is relatively small and the flow of water through filtering systems is relatively high as a percentage of the water accessible to the participant in the structure. The term "wave pool" implies a water play structure with a relatively large volume (depth) of water (compared to a splash pad of similar surface area) which way may be controlled by actuators to form waves or tides. Generally the depth of a wave pool is substantially larger than the depth of a splash pad as the participants of a wave pool will be older, taller, and/or more physically adept than the participants of a splash pad. Water structures generally utilize gravitational flow and or pressurized flow to move water through or across apparatuses providing entertainment and/or exercise to the participant(s). Examples of water structures include water cannons, water slides, dumping buckets, sprinklers, waterwheels, water mills, etc. In many cases, the participant can physically manipulate you to the actuation of the water such as by a valve or angular position of a trough or bucket or in other examples may alter the direction of flow of the water structure such as by grasping the nozzle structure of a spray can and directing it in a different orientation.

Figure 2:
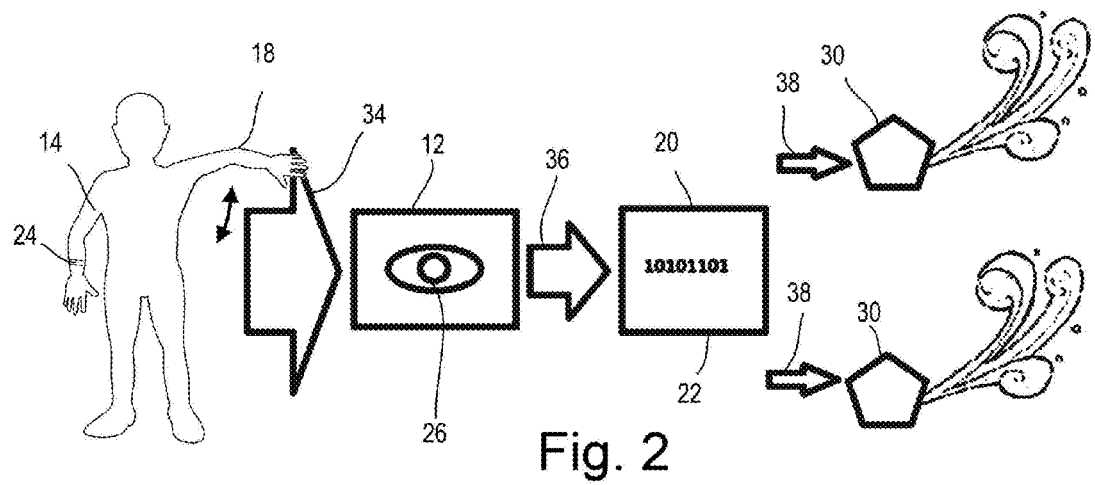
FIG. 2 is a diagram of the disclosed system in use.
Figure 3:
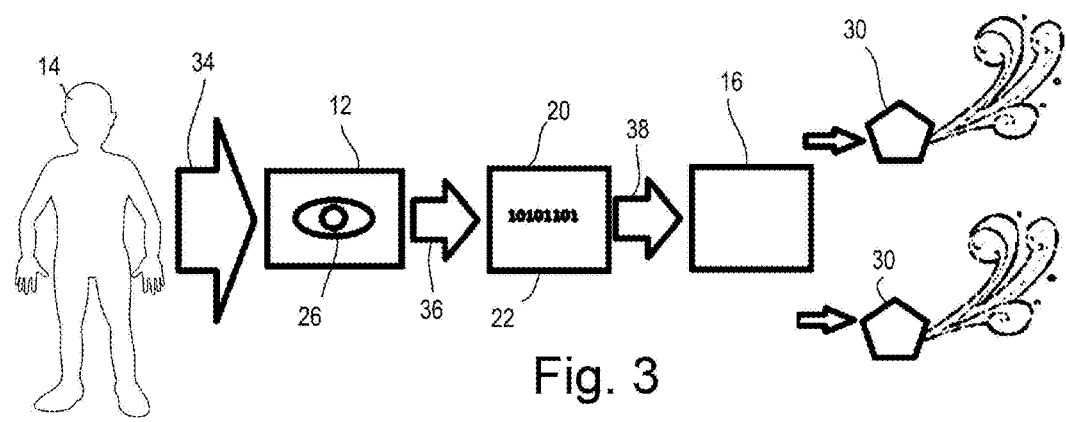
FIG. 3 is a diagram of the disclosed system coupled to actuation hardware.
Figure 4:
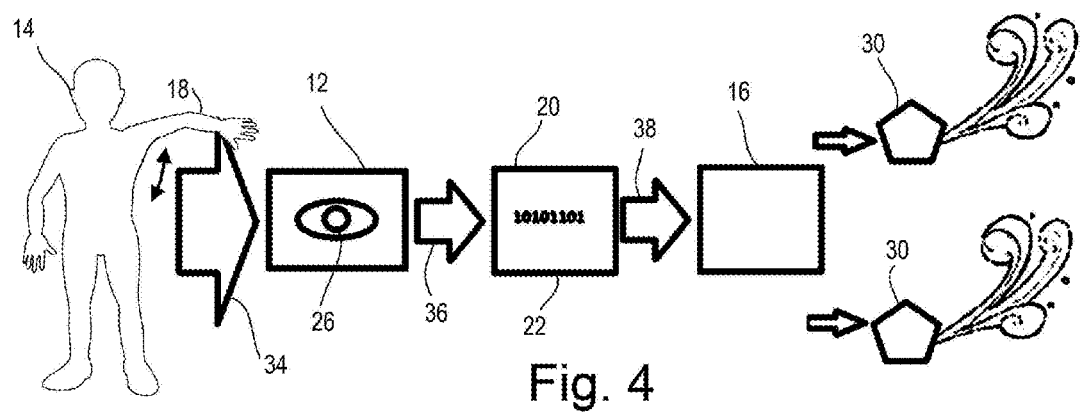
FIG. 4 is a diagram of the disclosed system in use, coupled to actuation hardware.

In operation as shown in FIG. 2 the gesture capture hardware 12 captures body position and gestures 18 of a participant 14 and translates these visual signals 34 to an input electronic signal 36. The input electronic signal is translated by software 22 resident on a non-transitory computer readable storage medium as is part of the computing device 20. The software 22 or microchip is programmed to recognize the input electronic signal and make interactive play structure decisions based on the position/movement/gestures of the participant. The play structure decisions are then translated to a control signal 38. In one example, (FIG. 3-4) the control signal is sent to actuation hardware 16 that moves, activates, or de-activates water features 30. Some examples of water features include: water spray nozzles, light emitting devices (LED's), water spraying devices, water sound devices, bubbling devices, wave machines, and water dumping devices.

Disclosed herein is a body and gesture recognition system 10 cooperating with a water play structure 32 having at least one water feature 30. Overall, the system 10 is to be utilized to allow a participant 14 or participants to interact with the water play structure 32 without direct contact control with the water play structure 32. The system requires neither a mechanical remote control nor an electronic device to be carried by the participant. In use, the gesture capture hardware 12 receives a visual signal 34 from the participant 14 by way of gestures 18 and/or body position that the participant performs. The gesture capture hardware 12 enables the participant to control and interact with a water feature without the need for a game controller, remote, or other device through a participant interface using gestures and/or spoken commands. The first of such gesture capture hardware 12 was introduced in November 2000 and was an attempt to broaden the audience of computer gamers.

Figure 1:
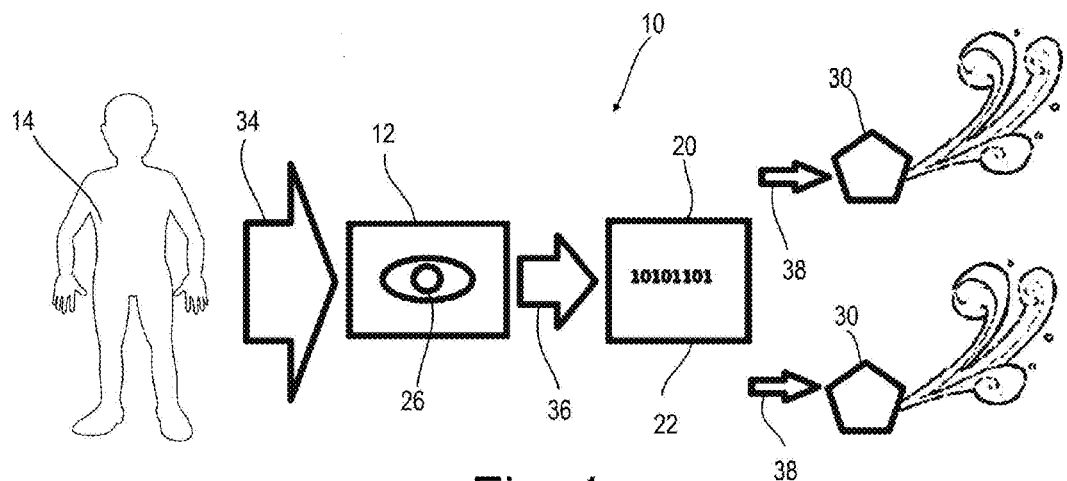
FIG. 1 is a diagram of the disclosed system.

Such gesture capture hardware devices 12 are commonly built on software technology developed on a range camera technology which developed a system that can interpret specific gestures and body positions, making completely hands-free control of electronic devices possible in one example by using an infrared projector and a camera 26 with a special microchip to track the movement of objects and individuals in three dimensions. This 3-D scanner system (often called light coding) employs a variant of image-based 3-D reconstruction. In FIG. 1, it can be appreciated that the gesture capture hardware 12 includes, or is coupled to, a computing device 20 including a computer readable storage medium wherein resides software 22 or a hard wired microchip which defines operation of the system. The device software 22 in one example is resident on the non-transitory computer readable storage medium to interpret the signals received by the gesture capture hardware 12 and translate the visual signals 34 to an input electronic signal 36.

Commonly, such gesture capture hardware 12 may include an RGB camera 26, depth sensor, and multi-array microphone commonly running software 22 on the computing device 20 or an associated component. These gesture capture hardware 12 commonly provide a full-body 3-D motion capture system, facial recognition, and/or optional voice recognition capabilities. In the example shown, the participant 14 may also wear a visual identification tag 24 such as an ID bracelet 40, necklace, charm, sticker, temporary tattoo, stamp, etc. The gesture capture hardware 12 or and associated component may visually recognize the ID tag and record the operations performed by participant 14 or alternatively act in a different manner depending on the participant 14 within visual or audio range of the gesture capture hardware 12.

In one example, the gesture capture hardware 12 includes a depth sensor. The depth sensor may consist of an infrared laser projector combined with a monochrome Complementary metal-oxide-semiconductor (CMOS) sensor, which captures video data in 3-D under normal ambient light conditions and converts this visual signal to the input electronic signal. The sensing range of the depth sensor is adjustable in many applications, and the software may be capable of automatically calibrating the sensor based on the participant's physical environment, accommodating for the presence of obstacles.

In many applications, the apparatus is capable of simultaneously tracking up to six or more participants 14. The participants 14 may be separated into active players and inactive players for motion/position analysis. In other applications, the number of participants the device can "see" is only limited by how many will fit in the field-of-view of the camera 26 or lens portion of the gesture capture hardware 12.

Disclosed herein is a water play structure 32 in several combinable examples which utilizes body and gesture recognition to control physical water play features 30 via the activation/deactivation of actuation hardware 16 such as for example: electrical linear actuators; solenoids; electrically operated water valves; pneumatically operated water valves; pneumatic or hydraulic linear actuators; electric motors; pneumatic or hydraulic rotary actuators; magnetism; water pumps, air pumps, and pneumatic bladders.

Gestures interpreted by the system may include: position of one or both hands, one or both feet, one or both legs, one or both arms, torso, entire body; motion of one or both hands, one or both feet, one or both legs, one or both arms, torso, entire body. This is a list of examples, and is not inclusive.

Several examples of the disclosed body and gesture recognition system for a water play structure are shown in the attached drawings. These examples are not intended to be an inclusive set of examples or uses of the overall apparatus. An alphanumeric numbering system is utilized to help identify similar but distinctive structures. For example, the schematic water feature is labeled 30 in FIG. 1 while in FIG. 5, the specific water feature being a wave/tide actuator includes the suffix "d" to indicate the specific example.

Figure 5:
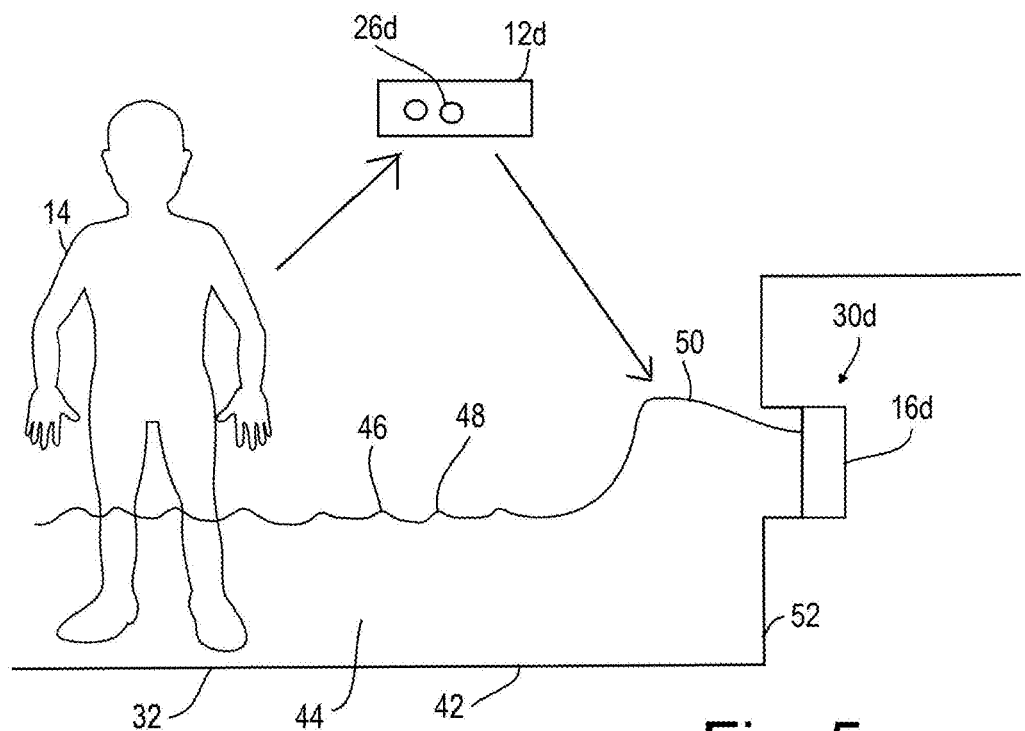
FIG. 5 is a diagram of the disclosed system used to control waves in a wave pool.

Looking to the example of FIG. 5 it can be seen that the participant 14 is standing within a wave pool 42 having a body of water 44 therein. Generally, the surface 46 of the water 44 in most situations will be substantially smooth save for ripples 48 caused by wind, or movement of the participant 14. In this example, a gesture capture hardware 12*d* is provided having a camera 26*d* visually aimed at the participant 14. Upon positioning of the participant 14 in a specific location, or upon identification of a particular participant 14, or upon the participant 14 making a specific gesture 18, the gesture hardware 12*d* sends an input electronic signal 36 to the computing device 20 which thereupon forwards a control signal 38 to a water feature actuator 16*d*.

In this example, the water feature actuator 16*d* is a wave/tide generator such as a piston, bellows, bladder, or similar water body movement actuator capable of producing a wave 50 or tide in the wave pool 42. Such wave/tide generators 30*d* are well-known in the art and generally controlled via a timer. Tides may be relatively slow actuation/water level raising/lowering with only one crest in the water play structure 32 while waves are much faster actuation with at least two crest to crest peak in the water play structure 32. Commonly, the size of the wave 50 and duration thereof may be programmed as a function of the depth/size of the wave pool 42 to maximize enjoyment of the participant 14. The participant may be capable of sending varying signals such as small/large fast/slow etc. Gestures 18 may be interpreted to control the intensity, direction, speed etc. of the wave 50 or speed etc. of the water actuator 16*d*. The waves may be formed by pneumatic actuators, hydraulic actuators, water pressure, bladder actuation, or the dumping of a large volume of water, etc.

As the gesture capture hardware 12 is also capable of tracking the position of the participant 14, and as multiple water actuators 30*d* may be installed at varying positions around the wall 52, it is conceived to have independent water actuators 16*d* actuated so as to induce a superposition wave 50 at a particular position, such as at or near the location of the participant 14.

Figure 6:
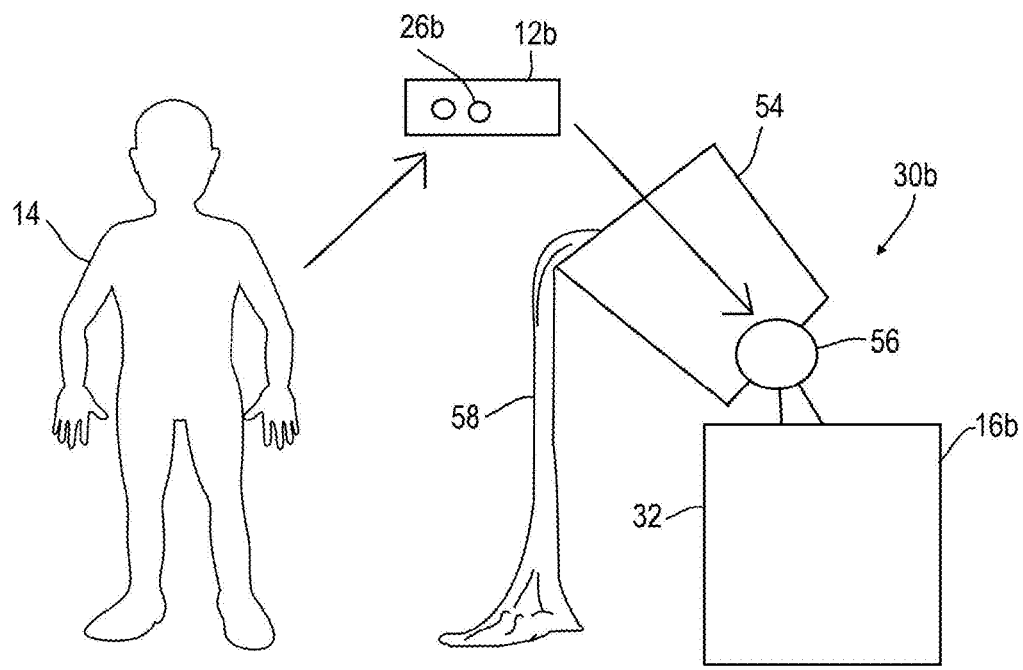
FIG. 6 is a diagram of the disclosed system used to control a water play structure.

Looking to FIG. 6, it can be seen that the participant 14 is standing within range of a water dumping bucket play structure 30*b*. Such water dumping bucket play structures 30*b* are well-known in the art and generally comprise a bucket 54 connected via a pivot 56 aligned with a horizontal axis so as to dump a volume of water 58. The water 58 may be dumped on or near the participant 14.

Actuation (dumping) of the bucket 54 has previously been set generally upon a timer. In another example, a spout 60 (see FIG. 9) pours water into the interior of the bucket 54 and once a trigger volume is achieved, the bucket 54 dumps of its own accord. In other prior examples, a latching mechanism may be utilized set on an electronic or mechanical timer. In such an example, the water feature actuator 16*b* may control the timing of release of the water 58 from the bucket 54.

In the example shown in FIG. 6, the participant 14 by way of position or gesture viewed by the gesture capture hardware 12*b* actuates the dumping mechanism 16*b* in a manner similar to that described in the first example.

Actuation about a vertical axis 84 (rotation in a horizontal plane) may also be manipulated by the participant 14.

Figure 7:
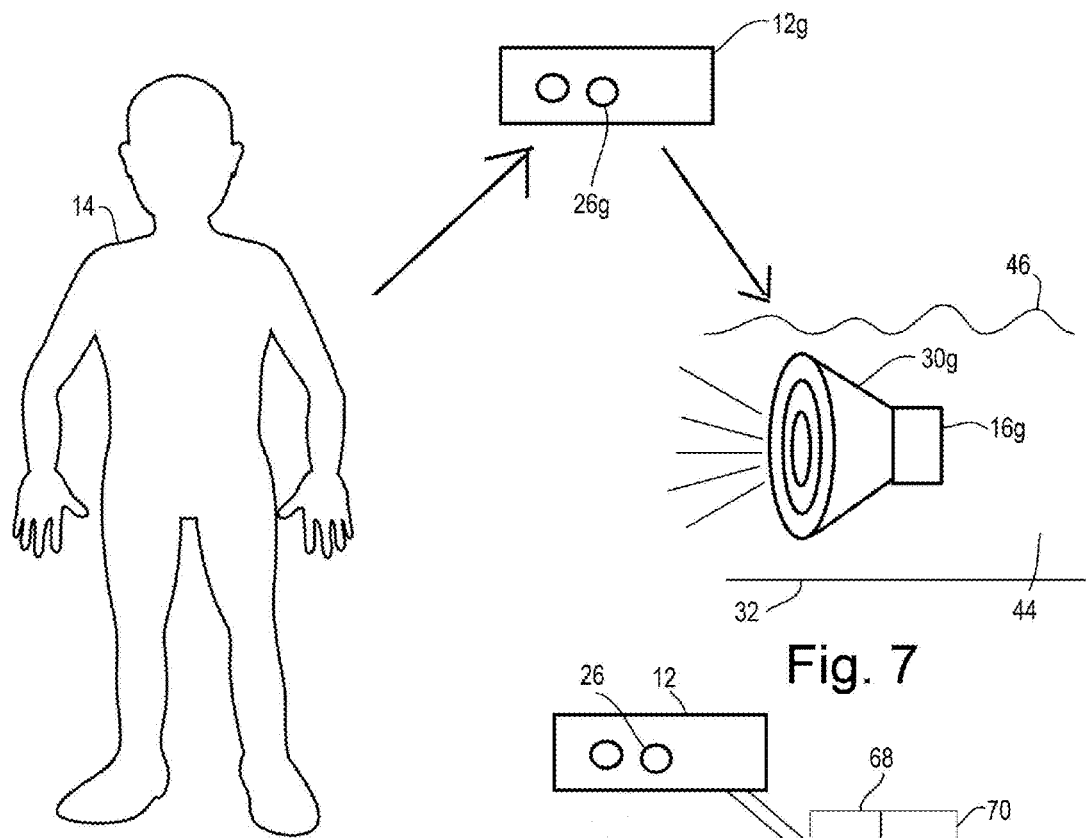
FIG. 7 is a diagram of the disclosed system used to control an audio speaker.

Looking to FIG. 7 is shown another example wherein the water feature 30*g* comprises a submerged speaker having a speaker driver 16*g* forming the actuation hardware. In this example, the speaker 30*g* (or the diaphragm thereof) is positioned below the surface 46 of the water 44 and therefore when actuated the speaker 30*g* sends an acoustic frequency waveform through the water 44 to the participant 14. As with other examples, the device software 22 may be configured to provide different amplitudes, frequencies of sounds as well as different sounds such as animal noises, automotive noises, boat noises, sirens, klaxon, etc. These characteristics may be dependent upon the specific position and/or gestures 18 of the participant 14.

Figure 8:
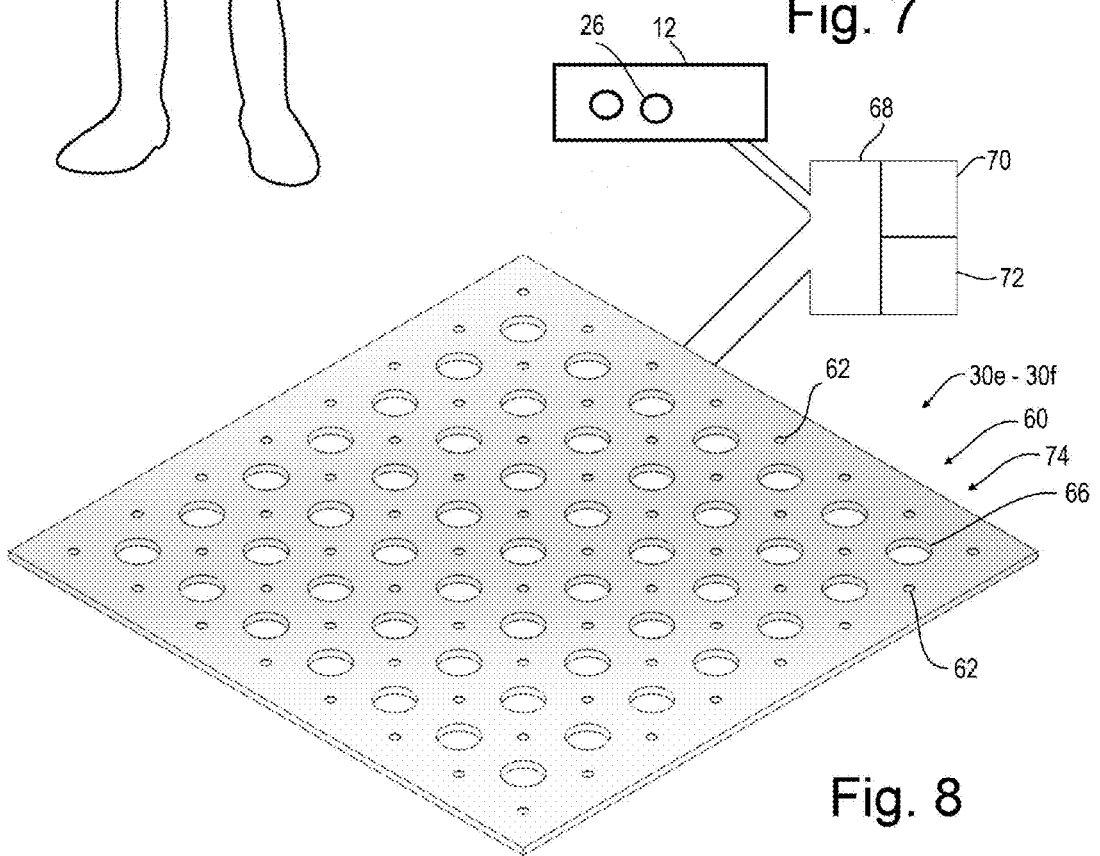
FIG. 8 is a diagram of one example of the disclose system used to control a light/wave/bubble plate used in a water play structure.

Looking to FIG. 8 is shown small section of a water play structure utilizing a plurality of potentially interoperating water features 30*e* and 30*f*. Water feature 30*e* comprises a light emitting device (LED) array which is controlled by way of the computing device 20. In this disclosure, the term LED will refer to a light emitting device, not to a light emitting diode in particular. Although light emitting diodes (especially tricolor diodes) may function very well for each of the light emitting devices in the array. As with the previous examples, the LED array 60 in one example comprising an interconnected series of LED's 62 may be actuated by the participant 14 through position and or gestures by way of the gesture capture hardware 12. It is to be understood that the LED array 60 may be operated by the computing device 20 in many different ways and patterns.

Figure 9:
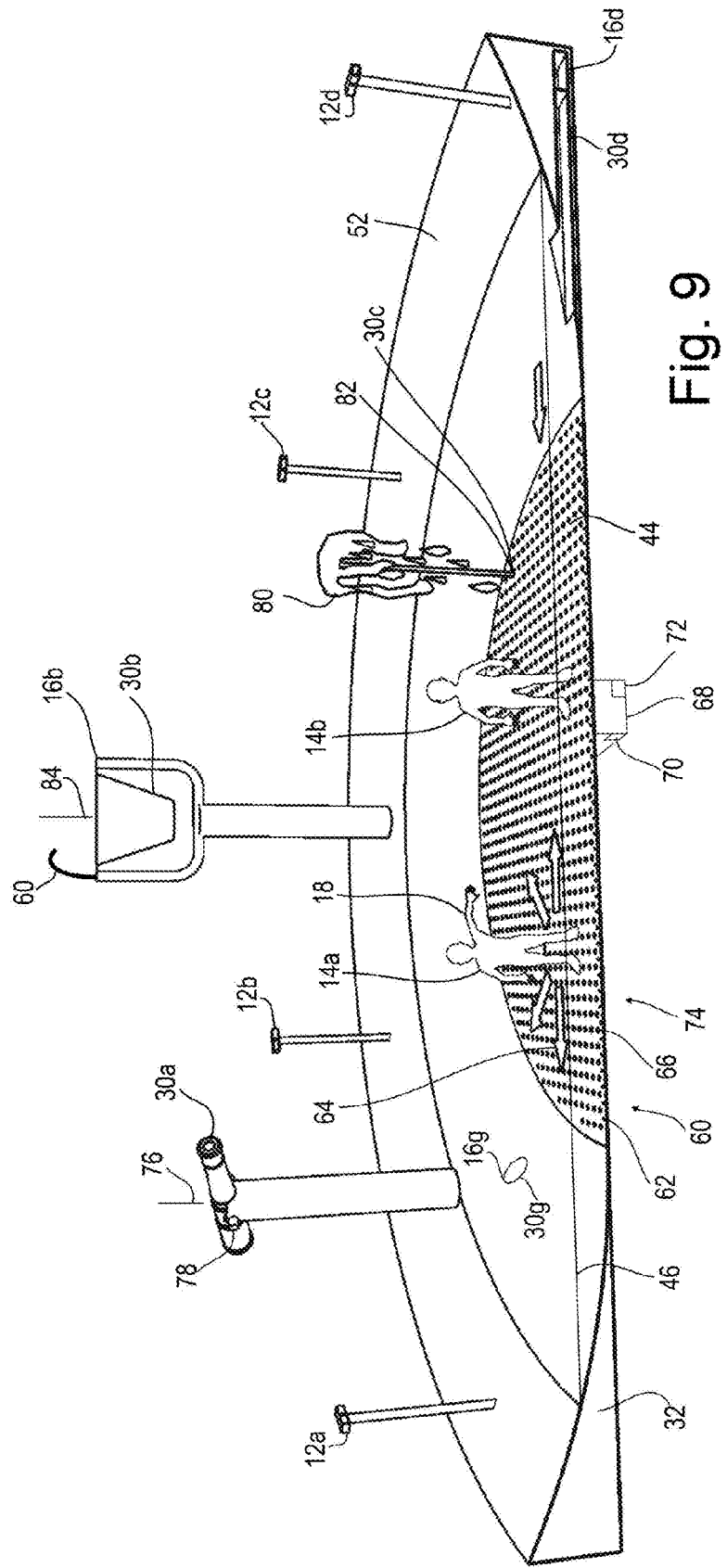
FIG. 9 is a cross sectional view of one example of a water play structure utilizing several examples of the disclosed system.

Looking to FIG. 9 is shown one example wherein a gesturing participant 14a is manipulating the LED array 60 such as by waving an arm in a particular manner defined by the operating parameters of the device software 22. Although the LED array 60 can be operated in many different patterns, the LED array 60 may provide a visual representation of outwardly radiating 64 ripples emanating from the gesturing participant 14a radially outward 64.

In one example, multicolor LED may be utilized, allowing the participant 14 to manipulate the light display colors.

Water feature 30f comprises an array 74 of air/water jets 66. The array 74 may be actuated in one example by way of a manifold 68 fluidly connected to an air pump 70 and/or water pump 72. In operation, the gesturing participant 14a may actuate the air pump 70-water pump 72 and/or manifold 68 by gesturing 18 or by positioning within the water play structure 32. Again, it is to be understood that the air/water jet array 74 can be controlled by the computing device 20 in many different ways and patterns dependent on the gestures or position of the participant 14. Looking still to FIG. 9 is shown one example wherein the gesturing participant 14a is manipulating the pressure water jet array 74 by way of a gesture 18. Again, for example if the gesture is the movement of the participant's legs, this will form small ripples in the water surface 46. These ripples may be enhanced by way of air/water being projected from the air/water jets 66 emanating radially outward 64 from the gesturing participant 14a or in other patterns. FIG. 8 shows a small section of this water feature.

In one example, the LED array 60 and air/water jet array 74 may be used in combination wherein small ripples may be accented by the water pump 72 in tandem with air bubbles provided through the air pump 70.

The air and/or water provided via features 30e and 30f can be activated for example via: fluid connections such as tubing and/or solenoid valves located under the surface of the LED grid or through holes in the LED grid; channels cut or otherwise formed into a substrate under the LED grid surface and through holes in the LED grid; channels cut or otherwise formed into a (clear) substrate on top of the LED grid surface; and the use of electrically activated/deactivated micro valves below or above the LED grid at each port location. In other examples, gestures may be combined in many of the water features 30. For example, in the LED array water feature 30e, a participant may create a wave by way of moving their legs and then direct the movement of this wave across the floor of the water play structure 32 by arm movements, by running, by facing a certain direction, etc. The movement of this wave may then be controlled by subsequent gestures.

Looking to FIG. 9 can be seen another water feature 30a comprising a water spray nozzle system which directs a stream of water from a water pump 72. In one example, the gesturing participant 14a can actuate the nozzle 30a by position within the water play structure 32 or by gestures 18. By varying the gestures or position, it may be possible for the gesturing participant 14a to control the pressure, volume, direction, etc. of the nozzle 30a. In this example, the nozzle is in the design of a pirate-style cannon for artistic appeal. In addition, this example of the nozzle 30a is mounted to a support column in which may contain a (solenoid) valve for remote actuation of the nozzle volume or pressure. The column may also house or be utilized as a fluid connection between the nozzle 30a and the water pump 72. In this example, the nozzle 30a is mounted through a vertical pivot 76 allowing articulation of the nozzle 30a in a horizontal plane. The nozzle 30a is also mounted through a horizontal pivot 78 allowing articulation of the nozzle 30a in a vertical plane. This combination allows the gesturing participant 14a to direct the nozzle 30a at themselves, or at other regions of the water play structure 32.

As the device software 22 may be programmed to identify the participant 14 through facial recognition identification tag or other identification methods, it may be possible to program the apparatus to only spray specific upper limit of volume/pressure at any individual participant. For example, the apparatus may be programmed to identify participants below a certain height so as to identify small children who may be injured by a high-volume water jet. With the actuation system it is possible for a gesturing participant 14a to direct the nozzle 30a at another participant 14b within the water play structure 32. The system may be configured to recognize the second participant 14b as a small child or person who has selected not to be the target of such water features.

FIG. 9 also shows a water feature 30c comprising a water feature output 80 generally being a column of water extending from a water jet 82. In one example, a participant 14b may kick their legs in a specific direction and at a relatively specific location resulting in the water column 80 which may be directed vertically as shown, or directed partially horizontally. Participants often make such a kicking motion to spray water on an adjacent participant 14 or at a target. It can be appreciated that by enhancing this mechanically enhanced water spray through a water pump 72 connected to the jet 82 the participant's interaction with the water play structure 32 will be enhanced. The water feature may be attached to a positionable nozzle wherein the angular position is actuated by gestures of the participant 14a.

Although in FIG. 9 it is shown a single gesture capture hardware device 12 is positioned adjacent to and controlling each water feature 30; is also conceived to have one or more gesture capture hardware devices 12 at various locations upon the water play structure 32 interconnected through the computing device 20 and device software 22 such that any participant 14 with control authority may actuate any of the water features 30 connected to said computing device 20.

The system may also utilize a play structure connection between standardized sub-sections that allows the transfer of power and data between a central control hub and swappable play feature nodes.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. A water play structure body and gesture recognition system comprising:
   a gesture capture device receiving visual signals from a participant;
   the gesture capture device tracks the movement of the participant in three dimensions;
   a translation apparatus converting the visual signals to an input electronic signal;
   a computing device electronically coupled to the gesture capture device recognizing the gesture made by the participant and converting the input electronic signal to a control signal;
   a water feature actuated by the control signal.

2. The body and gesture recognition system as recited in claim 1 comprising a spray nozzle and the control signal actuates the volume of water through the spray nozzle.

3. The body and gesture recognition system as recited in claim 1 comprising a spray nozzle and the control signal actuates the pressure of water through the spray nozzle.

4. The body and gesture recognition system as recited in claim 1 comprising a spray nozzle and the control signal actuates the vertical articulation of the spray nozzle.

5. The body and gesture recognition system as recited in claim 1 comprising a spray nozzle and the control signal actuates the horizontal articulation of the spray nozzle.

6. The body and gesture recognition system as recited in claim 1 wherein the water feature is a dumping bucket and the control signal actuates the dumping of the bucket.

7. The body and gesture recognition system as recited in claim 6 wherein the water feature is a dumping bucket and the control signal actuates the rotation of the bucket about a vertical axis.

8. The body and gesture recognition system as recited in claim 1 comprising:
   an array of water jets in the floor of the water play structure;
   a water manifold fluidly coupled to each water jet in the array;
   a water pump fluidly coupled to the water manifold; and
   the control signal actuates the volume or pressure of water through the water jets.

9. The body and gesture recognition system as recited in claim 8 wherein the water manifold comprises a valve at each water jet and the control signal actuates each valve.

10. The body and gesture recognition system as recited in claim 8 further comprising an air pump fluidly coupled to the manifold and the control signal actuates air volume or pressure through the water jets.

11. The body and gesture recognition system as recited in claim 1 comprising:
    an array of jets in the floor of the water play structure;
    a manifold fluidly coupled to each jet in the array;
    an air pump fluidly coupled to the manifold; and
    the control signal actuates the volume or pressure of air through the jets.

12. The body and gesture recognition system as recited in claim 1 comprising:
    an array of LED's in the floor of the water play structure; and
    the control signal actuates the LED's.

13. The body and gesture recognition system as recited in claim 1 comprising a wave/tide generator and the control signal actuates the wave/tide generator.

14. The body and gesture recognition system as recited in claim 1 comprising a facial recognition system configure to manipulate the control signal.

15. The body and gesture recognition system as recited in claim 1 comprising a depth sensor determining the position of the participant relative to the gesture capture device.

16. The body and gesture recognition system as recited in claim 1 comprising gesture capture hardware capable of tracking the position of the participant.

17. A water play structure body and gesture recognition system comprising:
    a gesture capture device receiving visual signals from a participant among several participants within the field of view of the gesture capture device;
    the gesture capture device tracks the movement of the participant in three dimensions;
    a translation apparatus converting the visual signals to an input electronic signal;
    a computing device electronically coupled to the gesture capture device recognizing the gesture made by the participant and converting the input electronic signal to a control signal;
    a water feature actuated by the control signal.

* * * * *